United States Patent
Ash et al.

(10) Patent No.: US 8,799,578 B2
(45) Date of Patent: *Aug. 5, 2014

(54) MANAGING UNMODIFIED TRACKS MAINTAINED IN BOTH A FIRST CACHE AND A SECOND CACHE

(75) Inventors: Kevin J. Ash, Tucson, AZ (US);
Michael T. Benhase, Tucson, AZ (US);
Lokesh M. Gupta, Tucson, AZ (US);
Matthew J. Kalos, Tucson, AZ (US);
Keneth W. Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 13/113,937

(22) Filed: May 23, 2011

(65) Prior Publication Data

US 2012/0303898 A1 Nov. 29, 2012

(51) Int. Cl.
*G06F 12/00* (2006.01)

(52) U.S. Cl.
USPC ............ 711/119; 711/133; 711/144; 711/136

(58) Field of Classification Search
USPC .................................................. 711/119, 136
See application file for complete search history.

(56) References Cited

U.S. PATENT DOCUMENTS

| | | | |
|---|---|---|---|
| 4,464,713 A | 8/1984 | Benhase et al. | |
| 5,437,022 A | 7/1995 | Beardsley et al. | |
| 5,636,359 A | 6/1997 | Beardsley et al. | |
| 5,991,775 A | 11/1999 | Beardsley et al. | |
| 6,108,764 A * | 8/2000 | Baumgartner et al. | 712/28 |
| 6,321,240 B1 | 11/2001 | Chillimbi et al. | |
| 6,460,122 B1 | 10/2002 | Otterness | |
| 6,785,771 B2 * | 8/2004 | Ash et al. | 711/136 |
| 7,107,385 B2 | 9/2006 | Rajan et al. | |
| 7,562,203 B2 | 7/2009 | Scott et al. | |
| 7,610,438 B2 | 10/2009 | Lee et al. | |
| 7,650,341 B1 | 1/2010 | Oratovsky et al. | |
| 7,669,022 B2 | 2/2010 | Maruyama et al. | |

(Continued)

FOREIGN PATENT DOCUMENTS

| | | |
|---|---|---|
| CN | 101122887 | 2/2008 |
| CN | 101527162 | 9/2009 |
| CN | 101819509 | 9/2010 |

OTHER PUBLICATIONS

U.S. Appl. No. 13/476,781, filed May 21, 2012, by inventors K. Ash, et al.

(Continued)

*Primary Examiner* — Reginald Bragdon
*Assistant Examiner* — Hannah A Faye-Joyner
(74) *Attorney, Agent, or Firm* — David W. Victor; Konrad Raynes Davda & Victor LLP

(57) ABSTRACT

Provided are a computer program product, system, and method for managing unmodified tracks maintained in both a first cache and a second cache. The first cache has unmodified tracks in the storage subject to Input/Output (I/O) requests. Unmodified tracks are demoted from the first cache to a second cache. An inclusive list indicates unmodified tracks maintained in both the first cache and a second cache. An exclusive list indicates unmodified tracks maintained in the second cache but not the first cache. The inclusive list and the exclusive list are used to determine whether to promote to the second cache an unmodified track demoted from the first cache.

18 Claims, 9 Drawing Sheets

(56) References Cited

U.S. PATENT DOCUMENTS

| | | | |
|---|---|---|---|
| 7,698,501 | B1 | 4/2010 | Corbett et al. |
| 7,702,870 | B2 | 4/2010 | English et al. |
| 7,721,043 | B2 | 5/2010 | Gill et al. |
| 7,725,651 | B2 | 5/2010 | Saito |
| 7,793,061 | B1* | 9/2010 | Gupta et al. ............... 711/162 |
| 7,930,325 | B2 | 4/2011 | Siegwart et al. |
| 8,255,627 | B2* | 8/2012 | Blinick et al. ............. 711/118 |
| 8,478,945 | B2* | 7/2013 | Ash et al. .................. 711/143 |
| 2006/0106891 | A1 | 5/2006 | Mahar et al. |
| 2009/0077312 | A1 | 3/2009 | Miura |
| 2009/0271412 | A1 | 10/2009 | Lacapra et al. |
| 2009/0271418 | A1 | 10/2009 | Vaghani et al. |
| 2010/0082774 | A1 | 4/2010 | Pitts |
| 2011/0087837 | A1 | 4/2011 | Blinick et al. |
| 2011/0191523 | A1* | 8/2011 | Caulkins .................. 711/103 |

OTHER PUBLICATIONS

U.S. Appl. No. 13/471,299, filed May 14, 2012 by M.T. Benase et al.
Preliminary Amendment filed Apr. 25, 2012, pp. 1-9, for U.S. Appl. No. 13/456,011, filed Apr. 25, 2012, by inventors M. Benhase, et al.
Preliminary Amendment filed May 14, 2012, pp. 1-19, for U.S. Appl. No. 13/471,299, filed May 14, 2012 by M.T. Benhase et al.
PCT International Search Report and Written Opinion dated Oct. 18, 2012, pp. 1-3, for Application No. PCT/IB2012/052563, filed May 2, 2012.
U.S. Appl. No. 13/456,011, filed Apr. 25, 2012, by inventors M.Benhase, et al.
USPTO Patent Application for Serial No. filed May 21, 2012 entitled "Managing Unmodified Tracks Maintained in Both a First Cache and a Second Cache" by inventors M.T. Benhase, pp. 1-33.
Preliminary Amendment dated May 21, 2012 for U.S. Appl. No. 13/476,781, filed May 21, 2012 by inventors M.T. Benhase, pp. 1-16.
U.S. Appl. No. 13/352,236, filed Jan. 17, 2012, entitled "Demoting Tracks From a First Cache to a Second Cache by Using a Stride Number Ordering of Strides in the Second Cache to Consolidate Strides in the Second Cache", by inventors M. Benhase,and L. Gupta.
U.S. Appl. No. 13/352,230, filed Jan. 17, 2012, entitled "Populating a First Stride of Tracks From a First Cache to Write to a Second Stride in a Second Cache", by inventors K. Ash, M. Benhase, L. Gupta, M. Kalos, K. Nielsen.
U.S. Appl. No. 13/352,224, filed Jan. 17, 2012, entitled "Demoting Tracks From a First Cache to a Second Cache by Using an Occupancy of Valid Tracks in Strides in the Second Cache to Consolidate Strides in the Second Cache", by inventors M. Benhase,and L. Gupta.
U.S. Appl. No. 13/352,239, filed Jan. 17, 2012, entitled "Demoting Partial Tracks From a First Cache to a Second Cache", by inventors K. Ash, M. Benhase,and L. Gupta.
Prelim Amend dated Apr. 15, 2012 for U.S. Appl. No. 13/113,974, filed May 23, 2011, by inventors M.Benhase, et al.
Preliminary Amendment dated Jul. 13, 2011 for U.S. Appl. No. 13/113,944, filed May 23, 2011, by inventors M.Benhase, et al.
Preliminary Amendment dated May 14, 2012 for U.S. Appl. No. 13/113,944, filed May 23, 2011, by inventors M.Benhase, et al.
"Check Point Copy for a Two Stage Store", IBM Corp., IP.com Document No. IPCOM000089366D,TDB Oct. 1977, pp. 1955-1958, Oct. 1, 1977, pp. 1-5.
"Serial ATA Native Command Queuing" joint WhitePaper by Intel Corporation and Seagate Technology, Jul. 2003, pp. 1-12.
"Multiple Command Control and Reordering", [online] [retrieved May 14, 2011],pp. 1-2 http://www.pcguide.com/ref/hdd/op/logicMultiple-c.html.
"Superparamagnetic Effect on Hard Disk Drive", [online] [retrieved May 16, 2011], pp. 1-2, http://www.dataclinic.co.uk/hard-disk-superparamagnetic-effect.html.
"Superparamagnetism", Wikipedia, [online] [retrieved May 19, 2011], pp. 1-5, http://en.wikipedia.org/w/index/php?title=Superparamagnetism&printable . . . .
"Seagate's Terabyte Platters Make it the Densest of the Lot", The Register, [online] [retrieved May 19, 2011], pp. 1-2, http://www.theregister.co.uk/2011/05/03seagate_terabyte_platter/ . . . .
Hitachi Demos 230 Gb Per Square Inch Data Density on Perpendicular Re . . . , [online] [retrieved May 19, 2011], pp. 1-9, http://www.physorg.com/news3588.html.
"Hard Disk Drive", Wikipedia, [online] [retrieved May 19, 2011], pp. 1-23, http://en.wikipedia.org/w/index.php?title=hard_disk_drive&printable=yes.
U.S. Appl. No. 13/113,974, filed May 23, 2011, by inventors M.Benhase, et al.
U.S. Appl. No. 13/113,931, filed May 23, 2011, by inventors M.Benhase, et al.
U.S. Appl. No. 13/113,944, filed May 23, 2011, by inventors M.Benhase, et al.
U.S. Appl. No. 13/113,949, filed May 23, 2011, by inventors M.Benhase, et al.
U.S. Appl. No. 13/113,953, filed May 23, 2011, by inventors M.Benhase, et al.
U.S. Appl. No. 13/113,958, filed May 23, 2011, by inventors M.Benhase, et al.
US Patent No. 7610438 is the English Counterpart of CN101122887.
English Machine Translation of CN101527162A.
English Machine Translation of CN101819509A.
Office Action dated Sep. 13, 2013, pp. 26, for U.S. Appl. No. 13/113,974, filed May 23, 2011.
Office Action dated Sep. 13, 2013, pp. 23, for U.S. Appl. No. 13/456,011, filed Apr. 25, 2012.
Office Action dated Jul. 30, 2013, pp. 22, for U.S. Appl. No. 13/476,781, filed May 21, 2012.
Office Action dated Jul. 19, 2013, pp. 26, for U.S. Appl. No. 13/113,944, filed May 23, 2011.
Office Action dated Jul. 19, 2013, pp. 26, for U.S. Appl. No. 13/471,299, filed May 14, 2012.
Patent Examination Report dated Jan. 15, 2014, pp. 1, for Application No. GB1321577.7, file date May 22, 2012.
Response to Examination Report dated Feb. 12, 2012, pp. 77, for Application No. GB1321577.7, file date May 22, 2012.
Response dated Dec. 13, 2013, pp. 10, to Office Action dated Sep. 13, 2013, pp. 26, for U.S. Appl. No. 13/113,974, filed May 23, 2011.
Final Office Action dated Dec. 26, 2013, pp. 11, for U.S. Appl. No. 13/113,974, filed May 23, 2011.
Response dated Dec. 13, 2013, p. 5, to Office Action dated Sep. 13, 2013, pp. 23, for U.S. Appl. No. 13/456,011, filed Apr. 25, 2012.
Notice Allowance dated Jan. 21, 2014, pp. 12, for U.S. Appl. No. 13/456,011, filed Apr. 25, 2012.
Response dated Oct. 30, 2013, p. 6, to Office Action dated Jul. 30, 2013, pp. 22, for U.S. Appl. No. 13/476,781, filed May 21, 2012.
Notice Allowance dated Nov. 19, 2013, pp. 15, for U.S. Appl. No. 13/476,781, filed May 21, 2012.
Response dated Nov. 19, 2013, p. 10, to Office Action dated Jul. 19, 2013, pp. 26, for U.S. Appl. No. 13/113,944, filed May 23, 2011.
Final Office Action dated Dec. 19, 2013, pp. 10, for U.S. Appl. No. 13/113,944, filed May 23, 2011.
Notice of Allowance dated Nov. 6, 2013, pp. 13, for U.S. Appl. No. 13/471,299, filed May 14, 2012.
Response dated Feb. 26, 2014, pp. 9, to Final Office Action dated Dec. 26, 2013, pp. 11, for U.S. Appl. No. 13/113,974, filed May 23, 2011.
Notice of Allowance dated Mar. 14, 2014, pp. 21 for U.S. Appl. No. 13/113,974, filed May 23, 2011.
Response dated Feb. 19, 2014, p. 7, to Office Action dated Dec. 19, 2013, pp. 10, for U.S. Appl. No. 13/113,944, filed May 23, 2011.
Notice Allowance dated Mar. 25, 2014, p. 30, for U.S. Appl. No. 13/113,944, filed May 23, 2011.

* cited by examiner

First Cache Control Block

Second Cache Control Block

Spatial Index Entry

MANAGING UNMODIFIED TRACKS MAINTAINED IN BOTH A FIRST CACHE AND A SECOND CACHE

BACKGROUND OF THE INVENTION

1. Field of the Invention

The present invention relates to a computer program product, system, and method for managing unmodified tracks maintained in both a first cache and a second cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

The LRU cache technique seeks to optimize for temporal locality so as to destage tracks that are least likely to be rewritten soon in order to minimize the number of destage operations, i.e., if a write that is not destaged is overwritten than the destaging of the overwritten write is avoided, thus saving the time and effort of writing the data from cache to disk. On the other hand there is also a desire to destage in a manner that exploits spatial locality, which means that data is written to storage locations that are closest to each other to minimize the distance the storage device write mechanism and storage media needs to be moved to reach the next storage location to write.

One technique for exploiting both temporal and spatial locality is the Wise Ordering for Writes (WOW) algorithm. The WOW algorithm employs a circular linked list or clock where the circular linked list has one entry for each write request buffered in cache. The entries are ordered in the linked list according to the storage location to which the associated write request is directed to exploit the benefits of spatial locality. Further, each entry includes a bit indicating whether the write data for the storage location in the cache has been recently updated. The bit for an entry is set when the write data for the entry is updated. A pointer points to a current entry in the circular linked list. A task using the WOW algorithm accesses an entry addressed by the pointer. If the bit for the entry indicates that the data for the entry in cache has been recently updated, then the bit is set to indicate that the write data has not been recently updated and the pointer incremented to point to the next entry so that the entry having write data to a storage location next closest in spatial proximity to the previously written storage location is considered. The entry is selected to write that is closest in spatial proximity to the last written storage location and whose bit indicates that the write data for the entry has not recently been updated.

Thus, with the WOW algorithm, spatial locality is exploited because a next entry to write is selected for consideration that is closest in spatial proximity to the last destaged write request. Further, temporal locality is exploited because an entry that has recently been written will be skipped until the pointer circles back to that skipped entry to consider.

Disk drives may implement the WOW algorithm and other algorithms that take both the linear and the angular position of the write tracks into account and optimize for both with respect to a current write head position to determine the minimal total service time. This process is referred to as "command re-ordering based on seek and rotational optimization". The disk drive logic boards will analyze write requests and determine which to do first based on both how much time will be required to seek to the various cylinders and angular position of the track to write, and how much time will elapse waiting for the data to rotate under the heads.

There is a need in the art for improved techniques for using cache in a storage system.

SUMMARY

Provided are a computer program product, system, and method for managing unmodified tracks maintained in both a first cache and a second cache. The first cache has unmodified tracks in the storage subject to Input/Output (I/O) requests. Unmodified tracks are demoted from the first cache to a second cache. An inclusive list indicates unmodified tracks maintained in both the first cache and a second cache. An exclusive list indicates unmodified tracks maintained in the second cache but not the first cache. The inclusive list and the exclusive list are used to determine whether to promote to the second cache an unmodified track demoted from the first cache.

DETAILED DESCRIPTION

Figure 1:
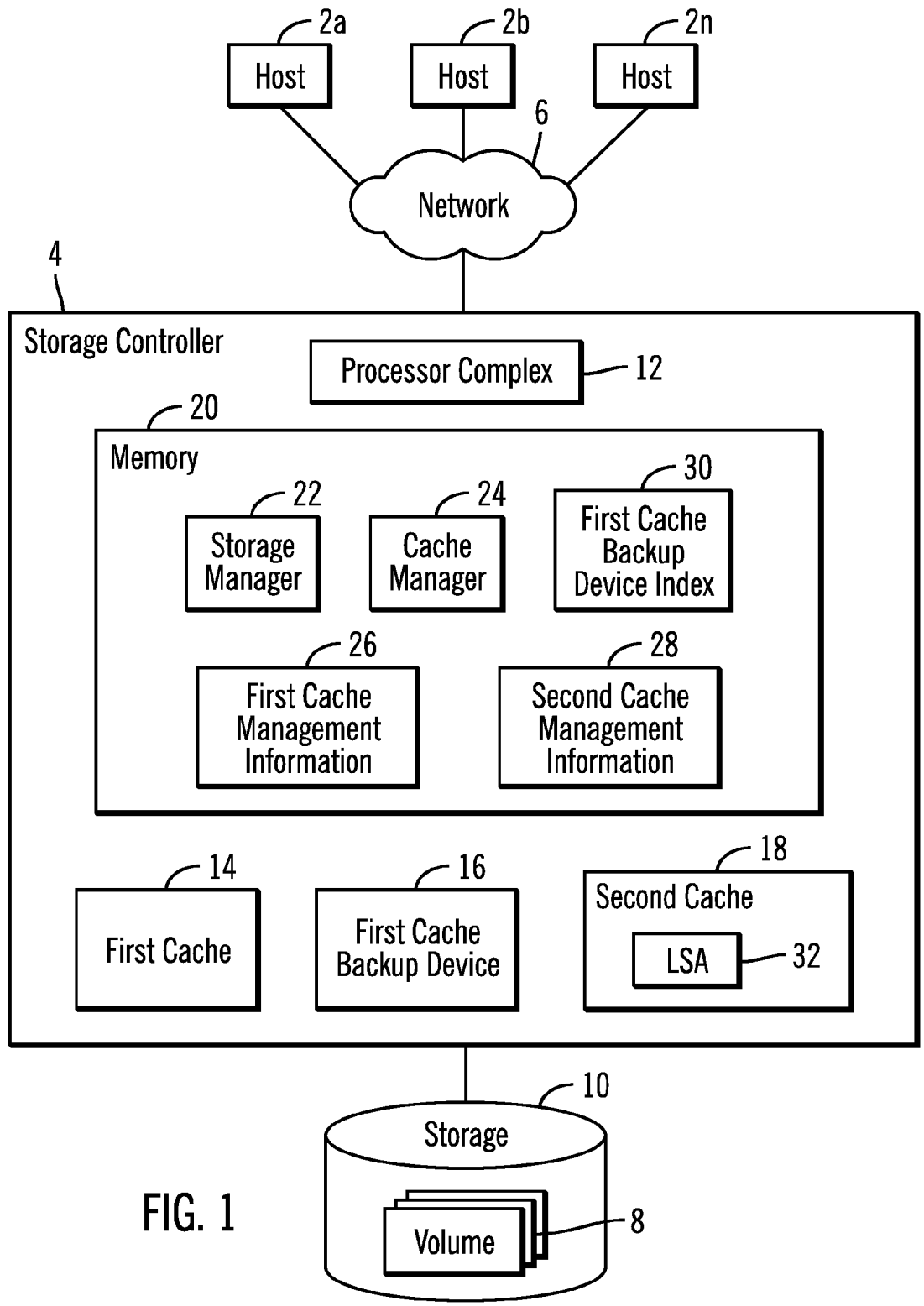
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 includes a processor complex 12, including one or more processors with single or multiple cores, a first cache 14, a first cache backup device 16, to backup tracks in the cache 14, and a second cache 18. The first 14 and second 18 caches cache data transferred between the hosts 2a, 2b . . . 2n and the storage 10. The first cache backup device 16 may provide non-volatile storage of tracks in the first cache 14. In a further embodiment, the first cache backup device 16 may be located in a cluster or hardware on a different power boundary than that of the first cache 14.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the first cache 14, first cache backup device 16, and the second cache 18. A track may comprise any unit of data configured in the storage 10, such as a track, Logical Block Address (LBA), etc., which is part of a larger grouping of tracks, such as a volume, logical device, etc. The cache manager 24 maintains first cache management information 26 and second cache management information 28 to manage read (unmodified) and write (modified) tracks in the first cache 14 and the second cache 18. A first cache backup device index 30 provides an index of track identifiers to a location in the first cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store tracks in a log structured array (LSA) 32, where tracks are written in a sequential order as received, thus providing a temporal ordering of the tracks written to the second cache 18. In a LSA, later versions of tracks already present in the LSA are written at the end of the LSA 32. In alternative embodiments, the second cache 18 may store data in formats other than in an LSA.

In one embodiment, the first cache 14 may comprise a Random Access Memory (RAM), such as a Dynamic Random Access Memory (DRAM), and the second cache 18 may comprise a flash memory, such as a solid state device, and the storage 10 is comprised of one or more sequential access storage devices, such as hard disk drives and magnetic tape. The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storage 10.

The first cache 14 may be part of the memory 20 or implemented in a separate memory device, such as a DRAM. In one embodiment, the first cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 2:
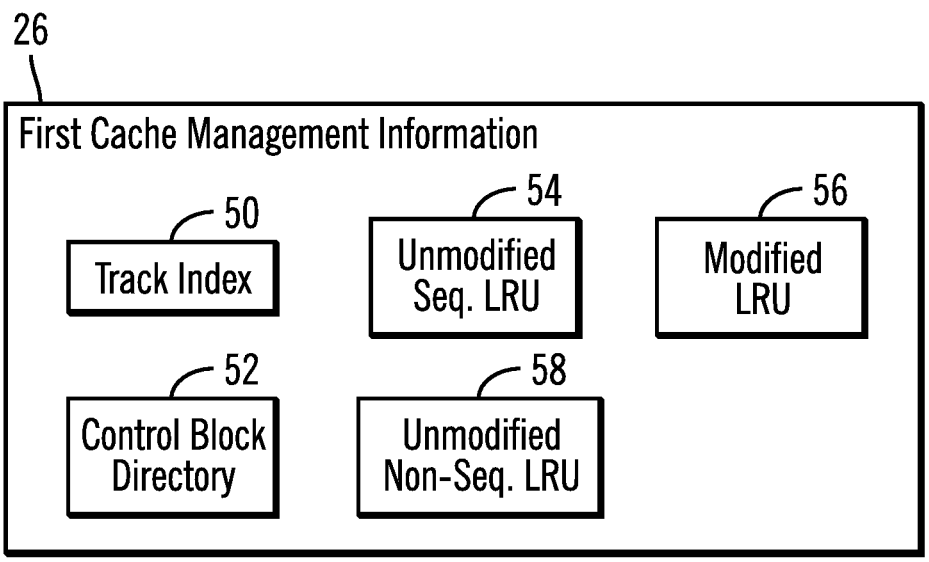
FIG. 2 illustrates an embodiment of first cache management information.

FIG. 2 illustrates an embodiment of the first cache management information 26 including a track index 50 providing an index of tracks in the first cache 14 to control blocks in a control block directory 52; an unmodified sequential LRU list 54 providing a temporal ordering of unmodified sequential tracks in the first cache 14; a modified LRU list 56 providing a temporal ordering of modified sequential and non-sequential tracks in the first cache 14; and an unmodified non-sequential LRU list 58 providing a temporal ordering of unmodified non-sequential tracks in the first cache 14.

In certain embodiments, upon determining that the first cache backup device 16 is full, the modified LRU list 56 is used to destage modified tracks from the first cache 14 so that the copy of those tracks in the first cache backup device 16 may be discarded to make room in the first cache backup device 16 for new modified tracks.

Figure 3:
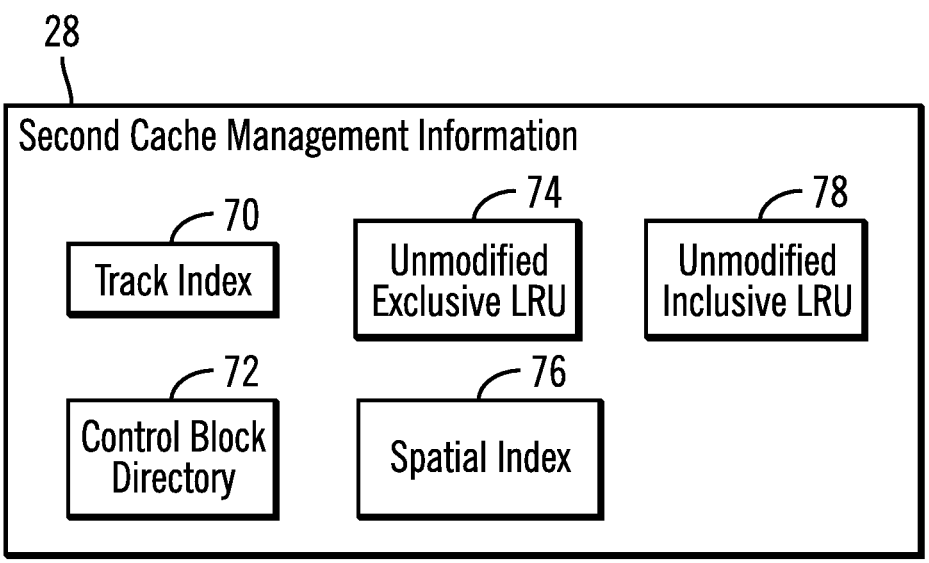
FIG. 3 illustrates an embodiment of second cache management information.

FIG. 3 illustrates an embodiment of the second cache management information 28 including a track index 70 providing an index of tracks in the second cache 18 to control blocks in a control block directory 72; an unmodified exclusive LRU list 74 providing a temporal ordering of unmodified non-sequential tracks available in the second cache 18 but not the first cache 14; a spatial index 76 providing a spatial ordering of the modified tracks in the second cache 18 based on the physical locations in the storage 10 at which the modified tracks are stored; and an unmodified inclusive LRU list 78 providing a temporal ordering of unmodified non-sequential tracks available in both the first cache 14 and the second cache.

All the LRU lists 54, 56, 58, 74, and 78 may include the track IDs of tracks in the first cache 14 and the second cache 18 ordered according to when the identified track was last accessed. The LRU lists 54, 56, 58, 74, and 78 have a most recently used (MRU) end indicating a most recently accessed track and a LRU end indicating a least recently used or accessed track. The track IDs of tracks added to the caches 14 and 18 are added to the MRU end of the LRU list and tracks demoted from the caches 14 and 18 are accessed from the LRU end. The track indexes 50 and 70 and spatial index 76 may comprise a scatter index table (SIT). Alternative type data structures may be used to provide the temporal ordering of tracks in the caches 14 and 18 and spatial ordering of tracks in the second cache 18.

Non-sequential tracks may comprise Online Line Transaction Processing (OLTP) tracks, which often comprise small block writes that are not fully random and have some locality of reference, i.e., have a probability of being repeatedly accessed.

Figure 4:
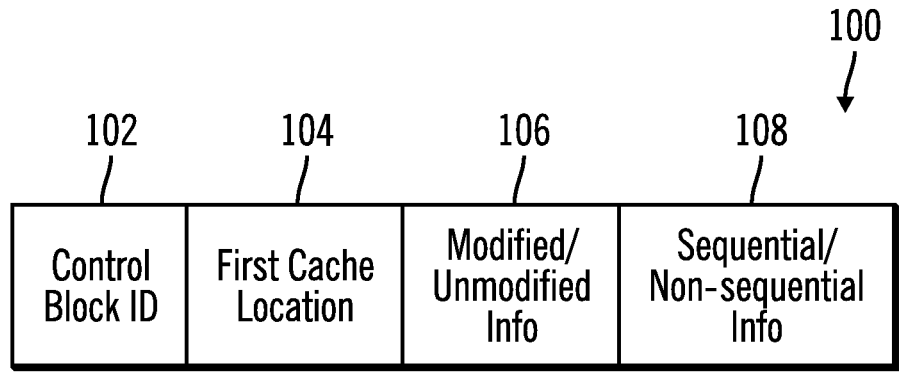
FIG. 4 illustrates an embodiment of a first cache control block.

FIG. 4 illustrates an embodiment of a first cache control block 100 entry in the control block directory 52, including a control block identifier (ID) 102, a first cache location 104 of the physical location of the track in the first cache 14, information 106 indicating whether the track is modified or unmodified, and information 108 indicating whether the track is a sequential or non-sequential access.

Figure 5:
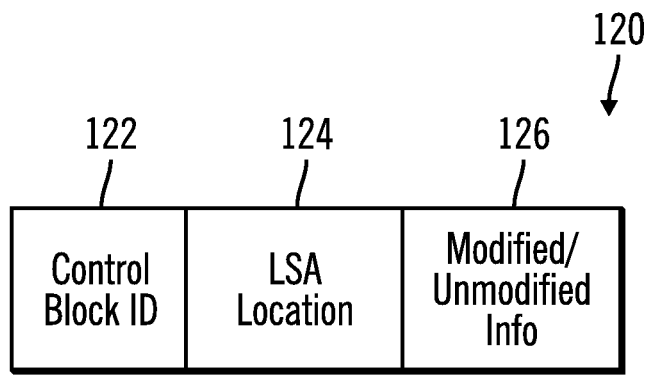
FIG. 5 illustrates an embodiment of a second cache control block.

FIG. 5 illustrates an embodiment of a second cache control block 120 entry in the second cache control block directory 72, including a control block identifier (ID) 122, an LSA location 124 where the track is located in the LSA 32, and information 126 indicating whether the track is modified or unmodified.

Figure 6:
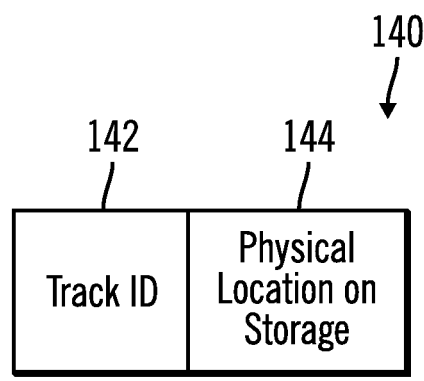
FIG. 6 illustrates an embodiment of a spatial index entry.

FIG. 6 illustrates a spatial index entry 140 including a track identifier 142 of a track in the second cache 18 and the physical location 144 of where the track is stored in the storage 10, such as a cylinder, platter, block address, and storage device identifier.

Figure 7:
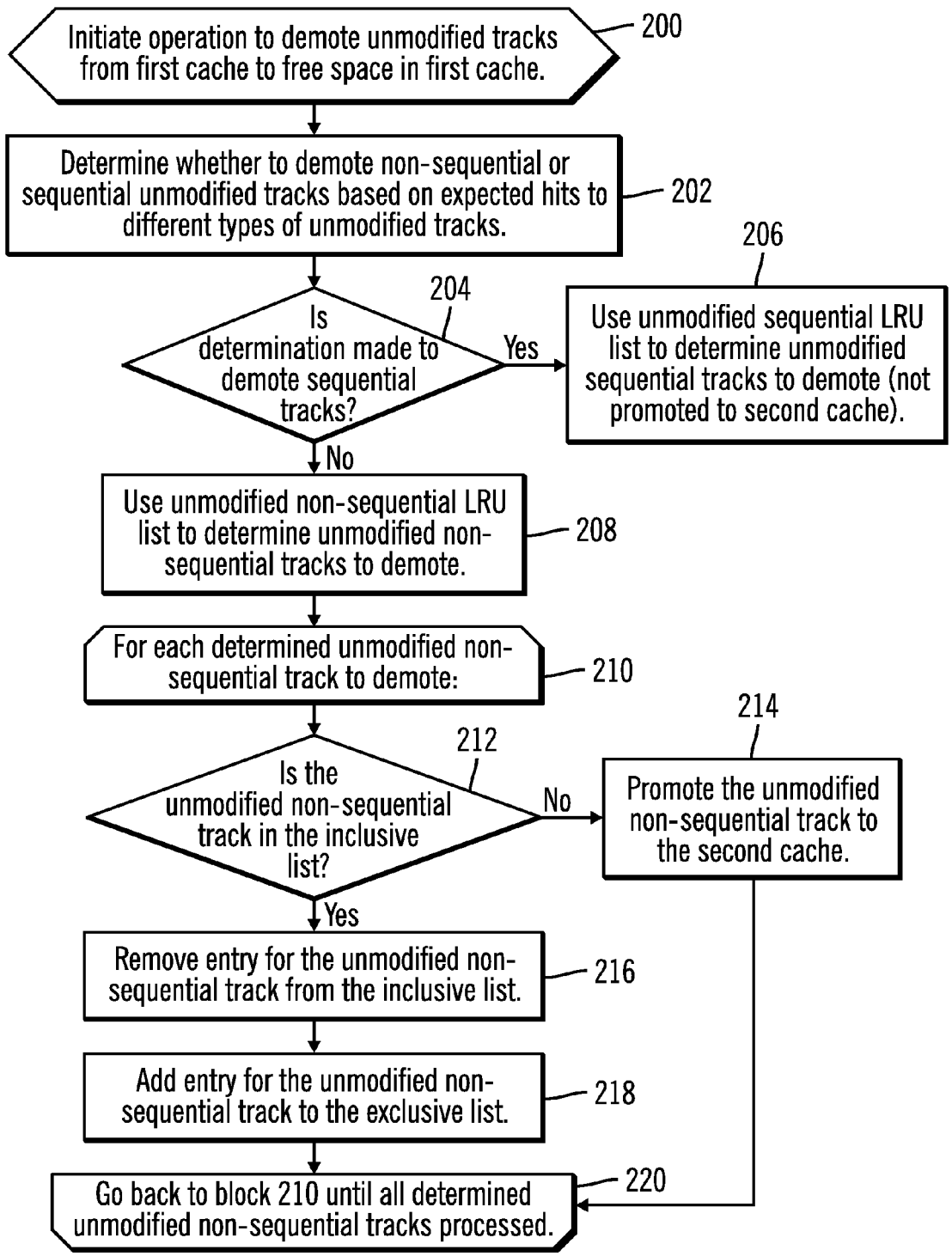
FIG. 7 illustrates an embodiment of operations to demote unmodified tracks from the first cache.

FIG. 7 illustrates an embodiment of operations performed by the cache manager 24 to demote unmodified tracks from the first cache 14. The demote operation may be initiated upon determining to free space in the first cache 14. Upon initiating (at block 200) an operation to determine whether to remove tracks from the first cache 14 to free space in the first cache 14, the cache manager 24 determines (at block 202) whether to demote non-sequential or sequential unmodified tracks based on expected hits to different types of unmodified tracks. If (at block 204) the determination is to demote unmodified sequential tracks, then the cache manager 24 uses (at block 206) the unmodified sequential LRU list 54 to determine unmodified sequential tracks to demote, from the LRU end of the list, which are not promoted to the second cache 18. If (at block 204) the determination is made to demote unmodified non-sequential tracks, then the cache manager uses the unmodified non-sequential LRU list 58 to determine (at block 208) unmodified non-sequential tracks to demote.

The cache manager 24 then performs a loop of operations at blocks 210-220 for each determined unmodified non-sequential track to demote. If (at block 212) the unmodified non-sequential track is in the unmodified inclusive list 78, meaning the unmodified non-sequential track is available in both the first 14 and second 18 caches, then there is no need to physically promote the track to the second cache 18 when it already exists there. In such case, the cache manager 24 removes (at block 216) the entry for the unmodified non-sequential track from the inclusive list 78, because when demoted from the first cache 14 the track will only be available in the second cache 18. An entry is added (at block 218) for the unmodified non-sequential track to the unmodified exclusive list 74 indicating that such track is only available in the second cache 18. If (at block 212) the unmodified non-sequential track is not in the unmodified inclusive list 78, meaning, at this point, that it is not in the second cache 18, then the cache manager 24 promotes (at block 214) the unmodified non-sequential track to the second cache 18, such as by performing the operations in FIG. 10.

The described operations of FIG. 7 conserve cache resources by avoiding the promotion/writing of an unmodified non-sequential track to the second cache 18 if that track is already in the second cache 18. Further, in described embodiments only unmodified non-sequential tracks are promoted to the second cache 18. In alternative embodiments, unmodified sequential tracks may also be promoted to the second cache 18 to be available for subsequent read requests.

Figure 8:
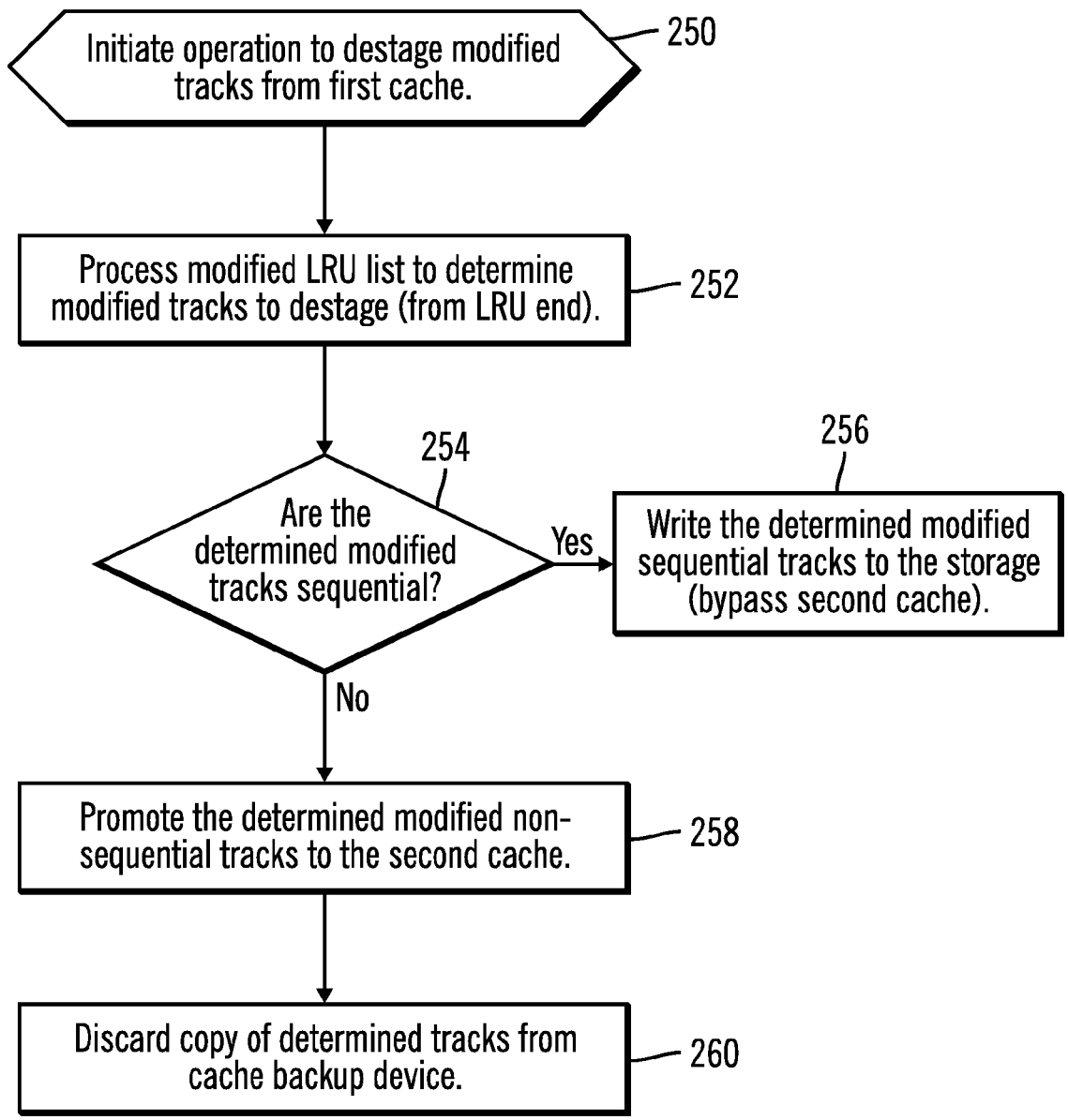
FIG. 8 illustrates an embodiment of operations to destage modified tracks from the first cache.

FIG. 8 illustrates an embodiment of operations performed by the cache manager 24 to destage modified tracks from the first cache 14. The cache manager 24 may regularly destage tracks as part of scheduled operations and increase the rate of destages if space is needed in the first cache backup device 16. Upon initiating (at block 250) the operation to destage modified tracks, the cache manager 24 processes (at bock 252) the modified LRU list 56 to determine modified tracks to destage, from the LRU end of the LRU list 56. If (at block 254) the determined modified tracks are sequential, then the cache manager 24 writes (at block 256) the determined modified sequential tracks to the storage 10, bypassing the second cache 18. If (at block 254) the modified tracks are non-sequential, then the cache manager 24 promotes (at block 258) the determined modified non-sequential tracks to the second cache 18 and discards (at block 260) the copy of the determined modified tracks from the first cache backup device 16.

With the operations of FIGS. 7 and 8, non-sequential tracks are demoted but not promoted to the second cache 18. Sequential modified (writes) are written directly to the storage 10, bypassing the second cache. Sequential unmodified tracks (reads) are discarded and not copied elsewhere, and unmodified non-sequential tracks demoted from the first cache 14 are promoted to the second cache 18.

Figure 9:
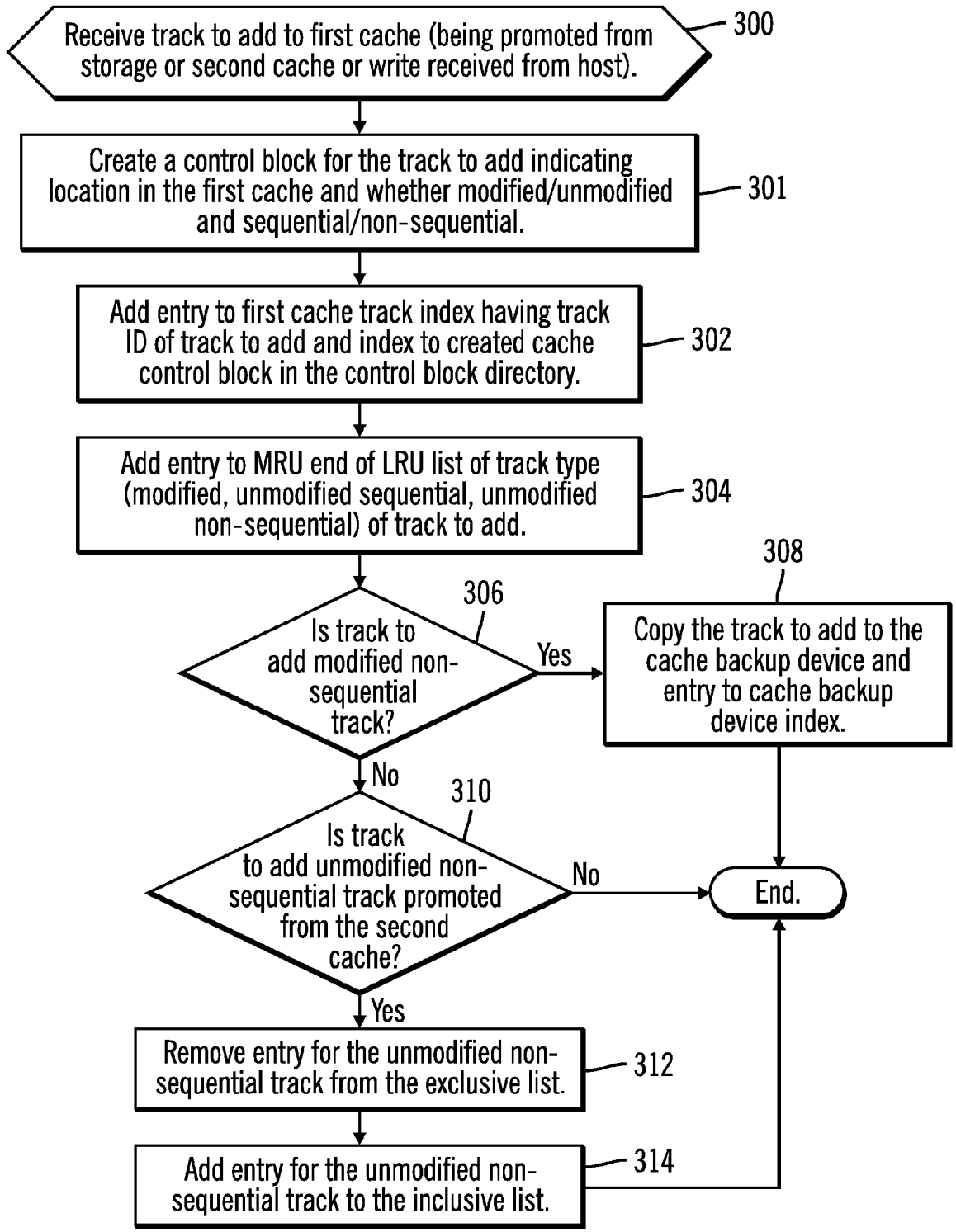
FIG. 9 illustrates an embodiment of operations to add a track to the first cache.

FIG. 9 illustrates an embodiment of operations performed by the cache manager 24 to add, i.e., promote, a track to the first cache 14, which track may comprise a write or modified track from a host 2a, 2b . . . 2n, a non-sequential track in the second cache 18 that is subject to a read request and as a result moved to the first cache 14, or read requested data not found in either cache 14 or 18 and retrieved from the storage 10. Upon receiving (at block 300) the track to add to the first cache 14, the cache manager 24 creates (at block 301) a control block 100 (FIG. 4) for the track to add indicating the 104 location in the first cache 14 and whether the track is modified/unmodified 106 and sequential/non-sequential 108. This control block 100 is added to the control block directory 52 of the first cache 14. The cache manager 24 adds (at block 302) an entry to the first cache track index 50 having the track ID of track to add and an index to the created cache control block 100 in the control block directory 52. An entry is added (at block 304) to the MRU end of the LRU list 54, 56 or 58 of the track type of the track to add. If (at block 306) the track to add is a modified non-sequential track, then the track to add is also copied (at block 308) to the first cache backup device 16 and an entry is added to the first cache backup device index 30 for the added track. If (at block 310) the track to add is an unmodified non-sequential track, then the cache manager 24 removes (at block 312) the entry for the unmodified non-sequential track from the unmodified exclusive list 74 and adds (at block 314) an entry for the unmodified non-sequential track to the unmodified inclusive list 78 because now that track is in both caches 14 and 18 because of the promotion to the first cache 14. If (at block 310) the track is unmodified sequential, then control ends.

Figure 10:
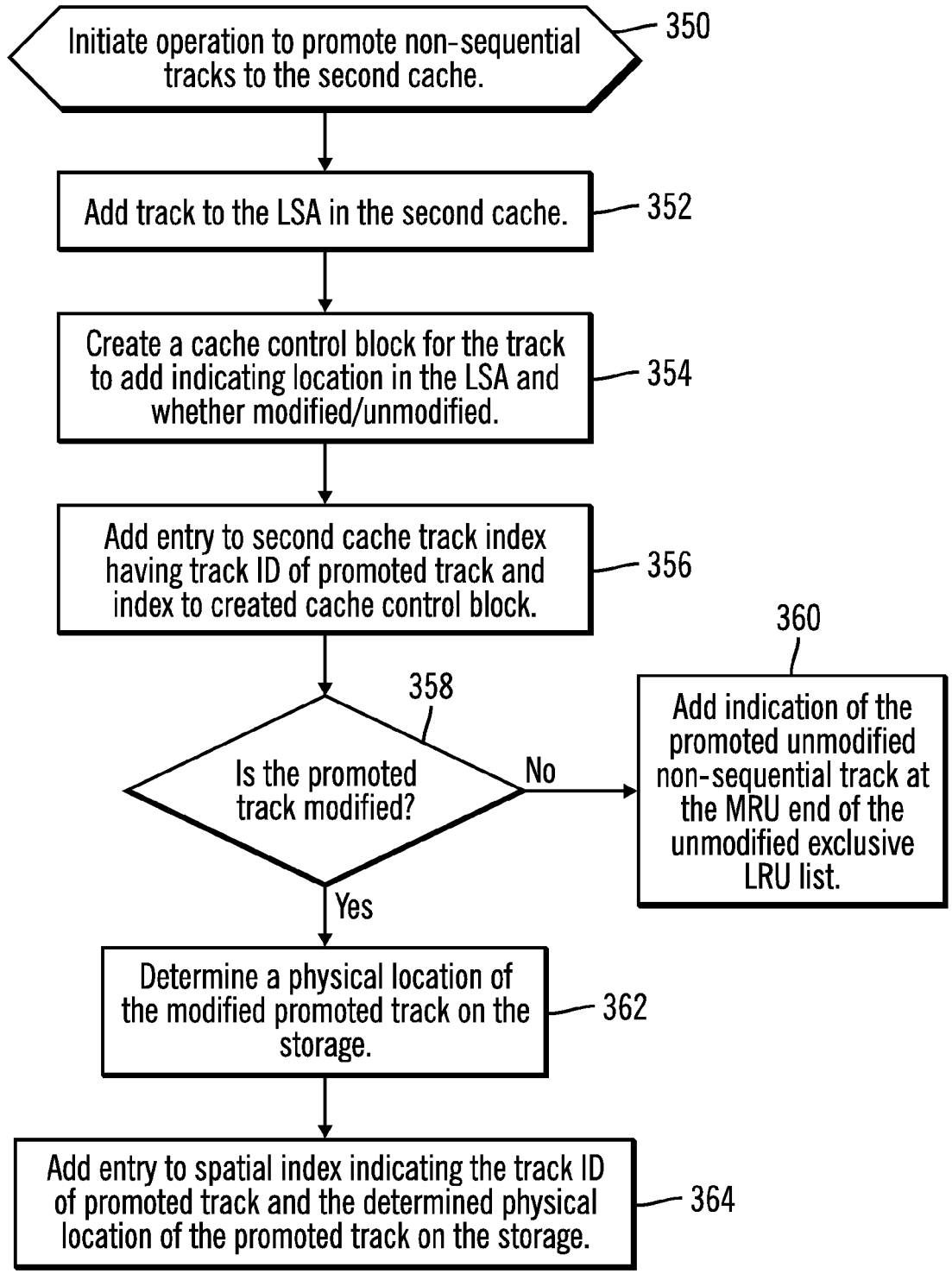
FIG. 10 illustrates an embodiment of operations to promote a track to the second cache.

FIG. 10 illustrates an embodiment of operations performed by the cache manager 24 to promote non-sequential tracks to the second cache 18 that is being demoted from the first cache 14. Upon initiating (at block 350) the operation to promote a track to the second cache 18, the cache manager 24 adds (at block 352) the track being promoted to the LSA 32 in the second cache 18 and creates (at block 354) a control block 120 (FIG. 5) for the track to add indicating the track location 124 in the LSA 32 and whether the track is modified/unmodified 126. An entry is added (at block 356) to the second cache track index 70 having the track ID of the promoted track and an index to the created cache control block 120 in the control block directory 72 for the second cache 18. If (from the no branch of block 358) the track being promoted is unmodified non-sequential data, then the cache manager 24 indicates (at block 360) the promoted track at the MRU end of the unmodified exclusive LRU list 74, such as by adding the track ID to the MRU end. If (at block 358) the promoted track is modified data, then the cache manager 24 determines (at block 362) a physical location of the where to write the modified promoted track on the storage 10 and adds (at block 364) an entry to the spatial index 76 indicating the track ID 142 of the promoted track and the determined physical location 144 of the promoted track on the storage 10.

Figure 11:
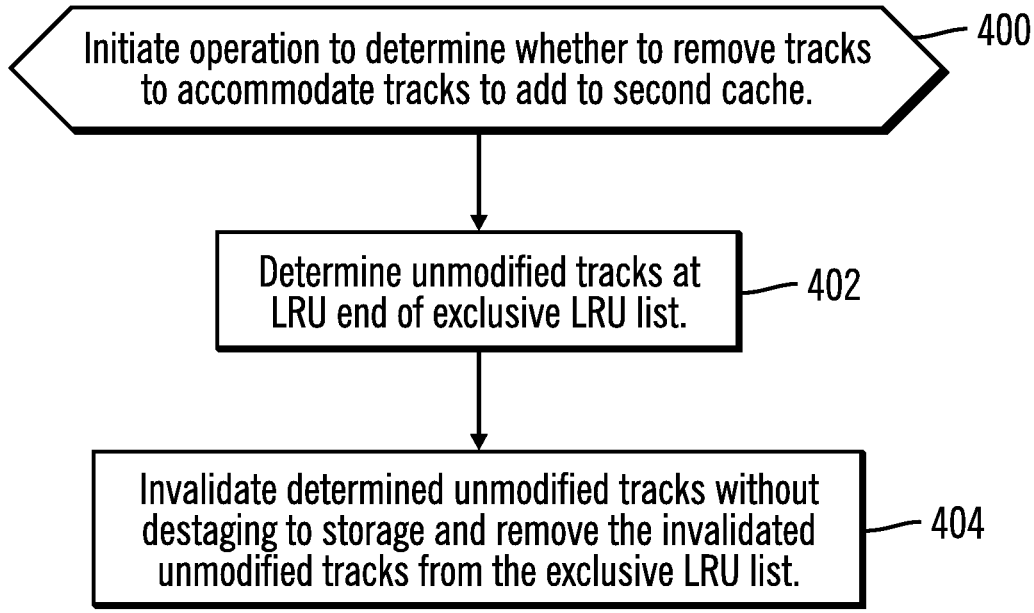
FIG. 11 illustrates an embodiment of operations to free space in the second cache.

FIG. 11 illustrates an embodiment of operations performed by the cache manager 24 to free space in the second cache 18 for new tracks to add to the second cache 18, i.e., tracks being demoted from the first cache 14. Upon initiating this operation (at block 400) the cache manager 24 determines (at block 402) unmodified non-sequential tracks in the second cache 18 from the LRU end of the unmodified exclusive LRU list 74 and invalidates (at block 404) the determined unmodified non-sequential tracks without destaging the invalidated unmodified tracks to the storage 10, and removes the entries for the invalidated unmodified non-sequential tracks from the exclusive LRU list 74.

Figure 12:
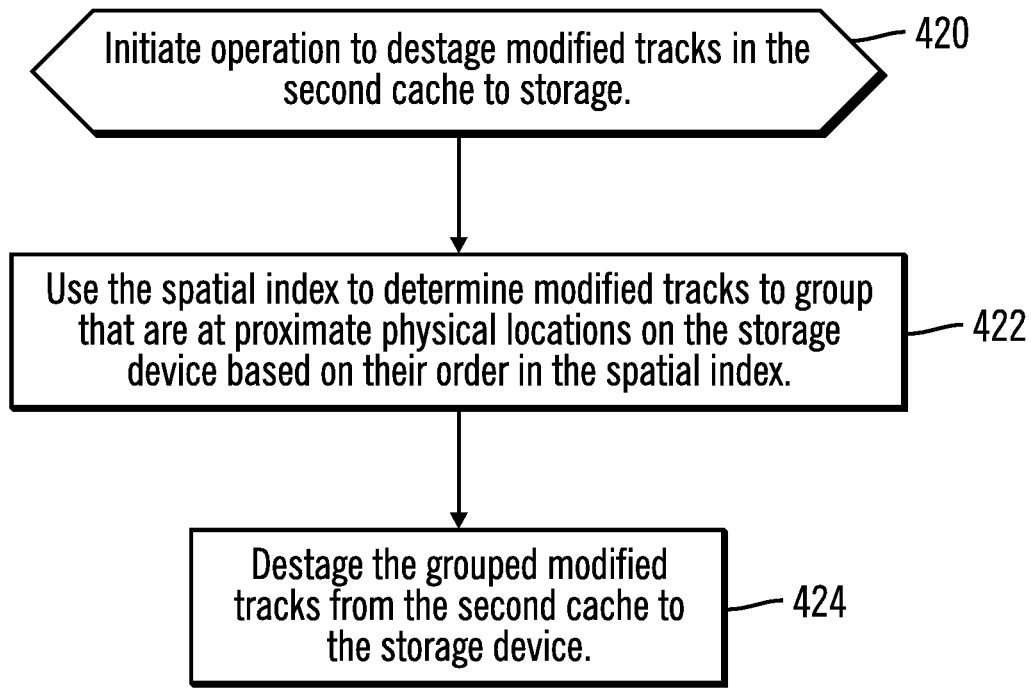
FIG. 12 illustrates an embodiment of operations to destage modified tracks from the second cache.

FIG. 12 illustrates an embodiment of operations performed by the cache manager 24 to destage modified tracks in the second cache 12 to the storage 10. Upon initiating (at block 420) the destage operation, the cache manager 24 uses (at block 422) the spatial index 76 to determine modified tracks in the second cache 18 to group that are at proximate physical locations on the storage device based on their order in the spatial index 76, such as a group of tracks at consecutive entries 140 (FIG. 6) in the location ordered spatial index 76. The determined grouped modified tracks are destaged (at block 424) from the second cache 18 to the storage device 10.

The operations of FIG. 12 optimize write operations to the storage 10, which comprises a sequential access storage device, by having the storage 10 write tracks at physical locations at closest physical proximity on the storage 10 writing surface, thus minimizing the amount of seeking and movement of the storage 10 write head to write the tracks in the second cache 18 to storage 10. The tracks were promoted to the second cache 18 from the from the first cache 16 based on temporal factors, such as their position in an LRU list 54, 56, 58, and not in an order optimized for sequential writing to a sequential access storage 10, such as a hard disk drive. Thus, the operations of FIG. 12 optimize the temporally ordered modified tracks based on their spatial location on the storage 10 to optimize writing at the storage 10.

Figure 13:
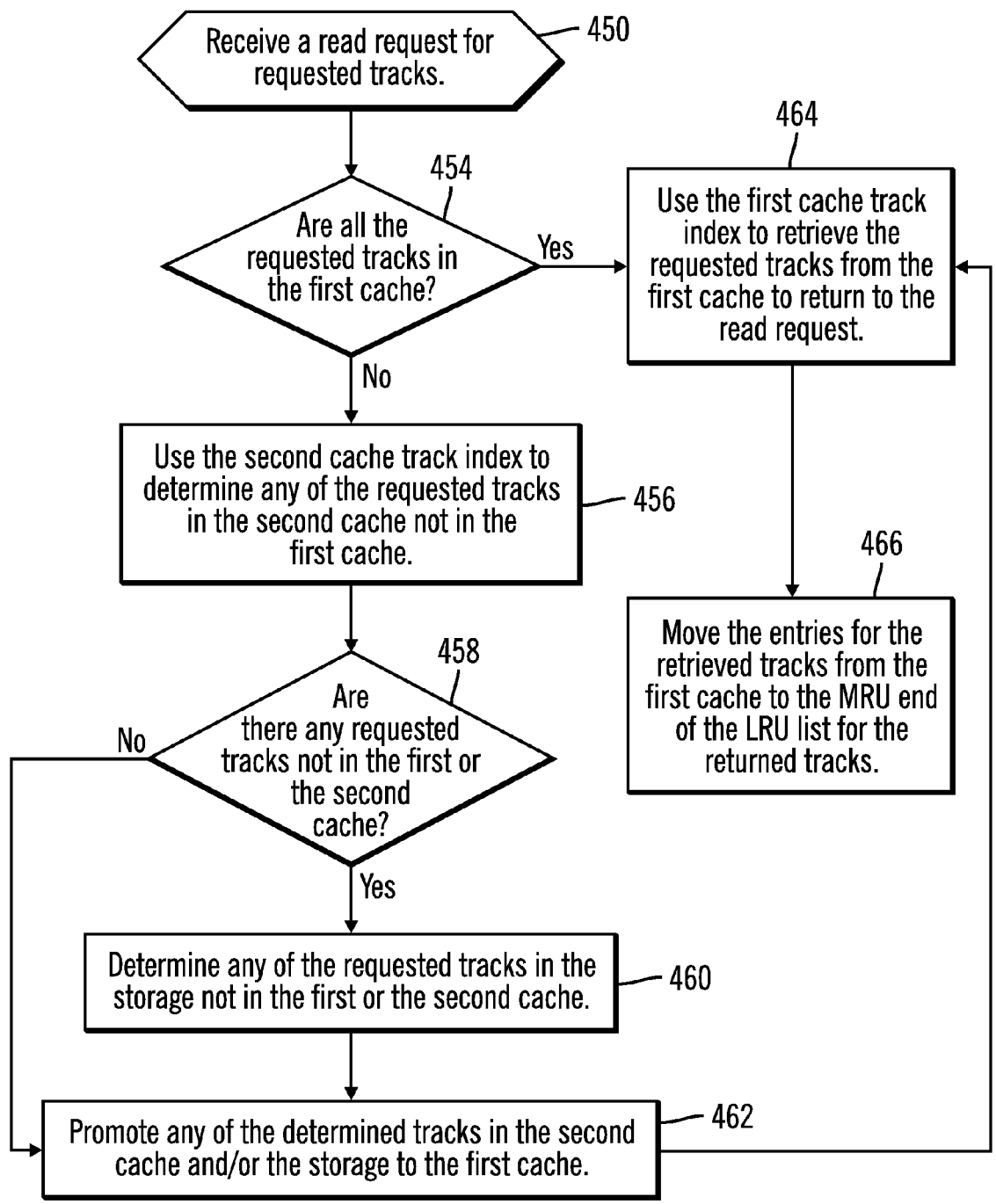
FIG. 13 illustrates an embodiment of operations to process a request for tracks to return to a read request.

FIG. 13 illustrates an embodiment of operations performed by the cache manager 24 to retrieve requested tracks for a read request from the caches 14 and 18 and storage 10. The storage manager 22 processing the read request may submit requests to the cache manager 24 for the requested tracks. Upon receiving (at block 450) the request for the tracks, the cache manager 24 uses (at block 454) the first cache track index 50 to determine whether all of the requested tracks are in the first cache 14. If (at block 454) all requested tracks are not in the first cache 14, then the cache manager 24 uses (at block 456) the second cache track index 70 to determine any of the requested tracks in the second cache 18 not in the first cache 14. If (at block 458) there are any requested tracks not found in the first 14 and second 18 caches, then the cache manager 24 determines (at block 460) any of the requested tracks in the storage 10, from the second cache track index 70, not in the first 14 and the second 18 caches. The cache manager 24 then promotes (at block 462) any of the determined tracks in the second cache 18 and the storage 10 to the first cache 14. The cache manager 24 uses (at block 464) the first cache track index 50 to retrieve the requested tracks from the first cache 14 to return to the read request. The entries for the retrieved tracks are moved (at block 466) to the MRU end of the LRU list 54, 56, 58 including entries for the retrieved tracks.

With the operations of FIG. 13, the cache manager 24 retrieves requested tracks from a highest level cache 14, then second cache 18 first before going to the storage 10, because the caches 14 and 18 would have the most recent modified version of a requested track. The most recent version is first found in the first cache 14, then the second cache 18 if not in the first cache 14 and then the storage 10 if not in either cache 14, 18.

Further, if there are read hits to tracks in the first cache 14 that are also included in the second cache 18, then with the described embodiments, the entry for the read unmodified track is moved to the MRU end of the first cache unmodified non-sequential LRU list 58, but the entry in the inclusive LRU list 78 is not moved to the MRU end of the inclusive LRU list 78 because modified tracks indicated in the inclusive LRU list are not demoted/destaged from the second cache 18.

Described embodiments provide techniques for allowing the use of a second level cache between a primary or first level cache and a storage to increase the cache space when the fastest access first cache 14 has the most expensive space, cost per byte, and a second cache, less expensive than the first cache but faster than the storage, can be used to increase the amount of cached data in the system. Increasing faster access cached storage space improves access to the cached data when requested data is in the cache and can be returned from cache instead of having to retrieve from the slower access, less expensive storage. Further, in described embodiments, tracks are added to the second cache based on a temporal ordering in the first cache, and then sorted in the second cache based on spatial physical location in the sequential access storage so that destaged tracks are written in groups of tracks at proximate or consecutive physical locations in the storage to optimize the writing of the tracks to the storage.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7-13 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data in a cache system and a storage device, the computer program product comprising a non-transitory computer readable storage medium having computer readable program code embodied therein that executes to perform operations, the operations comprising:

maintaining in a first cache unmodified tracks in the storage subject to Input/Output (I/O) requests;
demoting unmodified tracks from the first cache to a second cache;
maintaining an inclusive list indicating unmodified tracks maintained in both the first cache and the second cache;
maintaining an exclusive list indicating unmodified tracks maintained in the second cache but not the first cache; and
using the inclusive list and the exclusive list to determine whether to promote to the second cache an unmodified track demoted from the first cache.

2. The computer program product of claim 1, wherein the first cache is a faster access device than the second cache and wherein the second cache is a faster access device than the storage.

3. The computer program product of claim 1, wherein the operations further comprise:
selecting an unmodified track in the first cache to demote;
demoting the selected unmodified track;
determining whether the selected unmodified track is in the inclusive list; and
promoting the selected unmodified track to the second cache in response to determining that the selected unmodified tracks is not in the inclusive list, wherein the selected unmodified track is not promoted to the second cache if the selected unmodified track is in the inclusive list.

4. The computer program product of claim 1, wherein the operations further comprise:
adding the selected unmodified track to the exclusive list in response to promoting the selected unmodified track to the second cache in response to demoting the selected track from the first cache; and
removing the selected unmodified track from the inclusive list as part of adding the selected unmodified track to the exclusive list.

5. The computer program product of claim 1, wherein the operations further comprise:
receiving a read request to a requested unmodified track maintained in the second cache but not the first cache;
promoting the requested unmodified track from the second cache to the first cache in response to receiving the read request; and
adding the requested unmodified track to the inclusive list in response to promoting the requested unmodified track to the first cache.

6. The computer program product of claim 5, wherein the operations further comprise:
removing the requested unmodified track from the exclusive list in response to promoting the requested unmodified track to the first cache.

7. The computer program product of claim 1, wherein the operations further comprise
selecting from the exclusive list an unmodified track to demote from the second cache;
demoting the selected unmodified track from the second cache; and
removing the selected unmodified track from the exclusive list.

8. The computer program product of claim 7, wherein the exclusive list comprises an exclusive Least Recently Used (LRU) list, wherein the selected unmodified track to demote from the second cache is selected from an LRU end of the exclusive LRU list to demote from the second cache.

9. The computer program product of claim 1, wherein the operations further comprise:
maintaining a first cache Least Recently Used (LRU) list indicating unmodified tracks in the first cache;
using the first cache LRU list to determine unmodified tracks in the first cache to demote from the first cache;
receiving a read request to a requested unmodified track indicated in the inclusive list and the first cache LRU list; and
moving an entry for the requested unmodified track to a most recently used (MRU) end of the first cache LRU list in response to the read request, wherein a position of an entry in the inclusive list for the requested unmodified track is not changed in response to the read request.

10. A system in communication with a storage device, comprising:
a first cache;
a second cache;
a processor;
a computer readable storage medium having code executed by the processor to perform operations, the operations comprising:
maintaining in the first cache unmodified tracks in the storage subject to Input/Output (I/O) requests;
demoting unmodified tracks from the first cache to the second cache;
maintaining an inclusive list indicating unmodified tracks maintained in both the first cache and the second cache;
maintaining an exclusive list indicating unmodified tracks maintained in the second cache but not the first cache; and
using the inclusive list and the exclusive list to determine whether to promote to the second cache an unmodified track demoted from the first cache.

11. The system of claim 10, wherein the first cache is a faster access device than the second cache and wherein the second cache is a faster access device than the storage.

12. The system of claim 10, wherein the operations further comprise:
selecting an unmodified track in the first cache to demote;
demoting the selected unmodified track;
determining whether the selected unmodified track is in the inclusive list; and
promoting the selected unmodified track to the second cache in response to determining that the selected unmodified tracks is not in the inclusive list, wherein the selected unmodified track is not promoted to the second cache if the selected unmodified track is in the inclusive list.

13. The system of claim 10, wherein the operations further comprise:
adding the selected unmodified track to the exclusive list in response to promoting the selected unmodified track to the second cache in response to demoting the selected track from the first cache; and
removing the selected unmodified track from the inclusive list as part of adding the selected unmodified track to the exclusive list.

14. The system of claim 10, wherein the operations further comprise:
receiving a read request to a requested unmodified track maintained in the second cache but not the first cache;
promoting the requested unmodified track from the second cache to the first cache in response to receiving the read request; and
adding the requested unmodified track to the inclusive list in response to promoting the requested unmodified track to the first cache.

15. The system of claim 14, wherein the operations further comprise:
  removing the requested unmodified track from the exclusive list in response to promoting the requested unmodified track to the first cache.

16. The system of claim 10, wherein the operations further comprise
  selecting from the exclusive list an unmodified track to demote from the second cache;
  demoting the selected unmodified track from the second cache; and
  removing the selected unmodified track from the exclusive list.

17. The system of claim 10, wherein the operations further comprise:
  maintaining a first cache Least Recently Used (LRU) list indicating unmodified tracks in the first cache;
  using the first cache LRU list to determine unmodified tracks in the first cache to demote from the first cache;
  receiving a read request to a requested unmodified track indicated in the inclusive list and the first cache LRU list; and
  moving an entry for the requested unmodified track to a most recently used (MRU) end of the first cache LRU list in response to the read request, wherein a position of an entry in the inclusive list for the requested unmodified track is not changed in response to the read request.

18. The system of claim 16, wherein the exclusive list comprises an exclusive Least Recently Used(LRU) list, wherein the selected unmodified track to demote from the second cache is selected from an LRU end of the exclusive LRU list to demote from the second cache.

* * * * *